United States Patent
Terry

(10) Patent No.: US 6,484,526 B2
(45) Date of Patent: Nov. 26, 2002

(54) MANIFOLD GAUGE ASSEMBLY

(75) Inventor: James A. Terry, Indianapolis, IN (US)

(73) Assignee: ICOR International, Inc., Indianapolis, IN (US)

( * ) Notice: Subject to any disclaimer, the term of this patent is extended or adjusted under 35 U.S.C. 154(b) by 0 days.

(21) Appl. No.: 10/044,607

(22) Filed: Jan. 11, 2002

(65) Prior Publication Data
US 2002/0092314 A1 Jul. 18, 2002

Related U.S. Application Data

(60) Provisional application No. 60/261,560, filed on Jan. 12, 2001.

(51) Int. Cl.$^7$ ................................................ F25B 45/00
(52) U.S. Cl. ................................. 62/292; 62/85; 62/77; 62/292; 62/149; 62/475
(58) Field of Search .............................. 62/85, 77, 292, 62/149, 475

(56) References Cited

U.S. PATENT DOCUMENTS

| | | | | |
|---|---|---|---|---|
| 4,092,865 A | * | 6/1978 | Strybel | 73/756 |
| 4,109,536 A | * | 8/1978 | Strybel | 73/756 |
| 5,010,743 A | * | 4/1991 | Hale | 62/292 |
| 5,396,774 A | * | 3/1995 | Hubbell, Jr. | 62/77 |
| 5,431,189 A | * | 7/1995 | Jones | 137/625.42 |
| 5,442,930 A | * | 8/1995 | Stieferman | 62/85 |
| 5,722,247 A | * | 3/1998 | Albertson et al. | 62/149 |
| 6,334,320 B1 | * | 1/2002 | Brown et al. | 62/149 |

* cited by examiner

Primary Examiner—William Doerrler
Assistant Examiner—Mark S. Shulman
(74) Attorney, Agent, or Firm—Brinks Hofer Gilson & Lione

(57) ABSTRACT

A manifold gauge assembly that combines in a single apparatus the features of a manifold gauge set and the features of a phase change device. The manifold gauge assembly may be utilized for charging both pure liquid refrigerants and blends of liquid refrigerants and still maintain the ability of full porting for vacuum optimization. The invention also comprises a phase change device adapted to be fixedly attached to a manifold.

29 Claims, 9 Drawing Sheets

MANIFOLD GAUGE ASSEMBLY

This application claims the benefit pursuant to 35 U.S.C. §119(e) of Provisional U.S. patent application Serial No. 60/261,560 filed on Jan. 12, 2001.

BACKGROUND OF THE INVENTION

The present invention relates to refrigeration systems, and more particularly, to a manifold gauge set assembly for use in charging a refrigerant into a refrigeration system at start-up or during a service condition.

Manifold gauge sets are utilized by air conditioning and refrigeration technicians to service and/or charge the equipment that comprises the air conditioning or refrigeration system. A manifold gauge set provides readout devices from which the operational (i.e., discharge and suction) pressures of the system can be determined, and provides one or more ports through which the technician can charge refrigerant from a storage cylinder into the system.

New air conditioning and refrigeration systems must be fully charged with refrigerant prior to first use of the system. In addition, existing systems from time to time require the addition of refrigerant to re-charge or top off a system due to the leakage of refrigerant from the system. When a refrigerant is to be charged into a refrigeration system, either as part of a new installation or as part of a service operation (top off), the refrigerant is typically charged into the system through a manifold gauge set. In a typical charging operation, the service technician pulls a vacuum through the gauge set on the system, and thereafter charges liquid refrigerant from the cylinder through the manifold gauge set and into the high side (also known as the liquid side) of the system.

As liquid refrigerant is charged into the system as part of a charging operation, the pressure in the high side gradually increases. If the pressure in the high side increases to an extent that it reaches the pressure inside the tank, the flow of liquid refrigerant ceases, and additional liquid refrigerant can no longer be introduced into the high side. In this event, the remaining portion of the refrigerant charge must be added to the low side (also known as the suction side) of the system in a vapor state.

It is well known in the refrigeration art that the removal of refrigerant vapor from a cylinder causes heat to be removed along with the vapor. As the temperature in the cylinder drops due to the removal of the heat with the vapor, the pressure in the cylinder also drops. As a consequence of this pressure drop, the rate of transfer of the vapor from the cylinder to the refrigeration system is reduced, ultimately to a point that the transfer becomes almost nonexistent. In order to increase the charge rate, and thereby more rapidly complete the charging operation, a service technician may attempt to circumvent the temperature/pressure loss in the cylinder by slowly introducing liquid (rather than vapor) from the cylinder into the low (suction) side of the system. Since the compressor can only compress low pressure vapor to high pressure vapor, the charging of liquid refrigerant into the low side can severely damage or even destroy the compressor. Such action can also result in harm to the technician due to the malfunction of the compressor.

The hazards associated with introducing liquid refrigerant directly into the low side of the compressor may be avoided when the technician utilizes a refrigerant phase change device. Applying Bernoulli's Principle (as the speed of a moving fluid increases, the pressure within the fluid decreases) to a volatile refrigerant allows for the expansion of the refrigerant with the drop in pressure and a change of state. Further application of the principle as described as the venturi effect is represented with different embodiments of the present invention.

Refrigerant phase change devices of this type are used to withdraw liquid refrigerant from the cylinder, rather than refrigerant vapor, for charging into the low side of the system. After being withdrawn from the cylinder, the liquid refrigerant passes through one or more pressure drop baffles, orifices or other restrictions in the phase change device, and is ultimately converted (flashed) to the vapor phase as it leaves the device and is charged into the low side of the system.

Since the early 1990's, in concert with the Montreal Protocol and the pending ban on CFC refrigerants, substitute or alternative refrigerants were developed to replace the refrigerants that were banned, or that were scheduled to be banned. With the exception of two single molecule refrigerants introduced for permanent inclusion in the industry, the remaining alternatives were classified as blends, which blends are zeotropic in nature.

Phase change devices as described are also utilized when the refrigerant composition to be charged into the system comprises a blend of refrigerants (i.e., a zeotrope), rather than a pure refrigerant. The individual components in a zeotrope boil, or change phase, at different temperatures, thereby causing the composition of the refrigerant blend to change at each component's respective boiling point. If a refrigerant composition comprising a blend of refrigerant components is charged into the system as a vapor, then the vapor will include an incorrect percentage of the various components of the liquid blend. In particular, the vapor charged into the system will generally comprise a higher percentage of the most volatile components than of the least volatile components. As a result, the true composition of the charged refrigerant will be altered from the intended composition, thereby hindering the charged system from performing as intended.

In addition, if refrigerant vapor enriched with one or more of the most volatile components is removed from the cylinder, the blend of refrigerants remaining in the cylinder will no longer include the proper percentages of each of the individual components. The use of the phase change device allows the technician to charge the refrigerant blend from the cylinder as a liquid, rather than as a vapor, thereby maintaining the proper percentages of the components of the refrigerant blend. Since multiple systems may be charged from a single cylinder of refrigerant, a cylinder having a compromised percentage composition could damage many systems and cause adverse economic consequences.

Although the benefits of using a phase change device are well known, the use of such devices can be inconvenient to a service technician. For example, as an initial matter, the device must be readily accessible to the technician, a feat that is not always accomplished when working at a remote site. The technician must then isolate the suction service access port, allowing removal of the suction side service hose from the manifold gauge set. This process will, as a result of this action, cause a slight expulsion of refrigerant trapped in the hose to the atmosphere as a consequence. The phase change device is installed at the suction hose connection port of the manifold gauge set, and the service hose is attached to the opposite side of the phase change device. The manifold gauge set suction side is opened allowing refrigerant to fill the hose, and the hose fitting is loosened at the system suction connection to purge any refrigerant and non-condensables to the atmosphere.

In an alternative arrangement, the center (or common) charging hose of the manifold gauge set is removed from the cylinder, resulting in the expulsion of refrigerant trapped in the hose to the atmosphere. The phase change device is secured to the refrigerant cylinder, and the center hose is attached to the phase change device. The cylinder valve is opened allowing refrigerant to fill the hose, and the hose fitting is loosened at the manifold gauge set to purge any refrigerant and non-condensable to the atmosphere. In the event the technician requires an unimpeded flow of refrigerant, then the process must be reversed to remove the phase change device from the cylinder.

The actions described above slow the operation, and require that the technician possess the proper equipment for introducing the device into the system.

It would be preferable if a charging operation could be carried out in a more efficient manner than is presently possible, by combining in a charging apparatus the benefits of a phase change device with the existing equipment of the system. Such a device should be sufficiently versatile such that a system evacuation (pulling a vacuum) and charging operation could be readily completed regardless of whether liquid refrigerant is being charged into the high or low side of the system, and without requiring the technician to connect or disconnect auxiliary devices after the charging operation has commenced and eliminate unnecessary multiple expulsions of refrigerant to the atmosphere.

SUMMARY OF THE INVENTION

The present invention overcomes the disadvantages present in charging operations by providing an improved manifold gauge assembly that combines in a single apparatus the features of a manifold gauge set and the features of a phase change device. Also included is an alternative phase change device that is adapted to be permanently affixed to an existing manifold gauge set to provide a device offering the same benefits as the integral apparatus.

The improved manifold gauge assembly may be utilized for charging both pure liquid refrigerants and blends of liquid refrigerants and still maintain the ability of full porting for vacuum optimization. Since the features of the manifold and the phase change device are combined, a technician may withdraw liquid refrigerant from a cylinder for charging into either the high side (as a liquid) or the low side (as a vapor resulting from phase conversion) of the system without the necessity of interrupting a charging operation for installation or elimination of equipment. The invention also comprises an improved phase change device adapted for fixed attachment with a manifold.

DETAILED DESCRIPTION OF THE INVENTION

Figure 1:
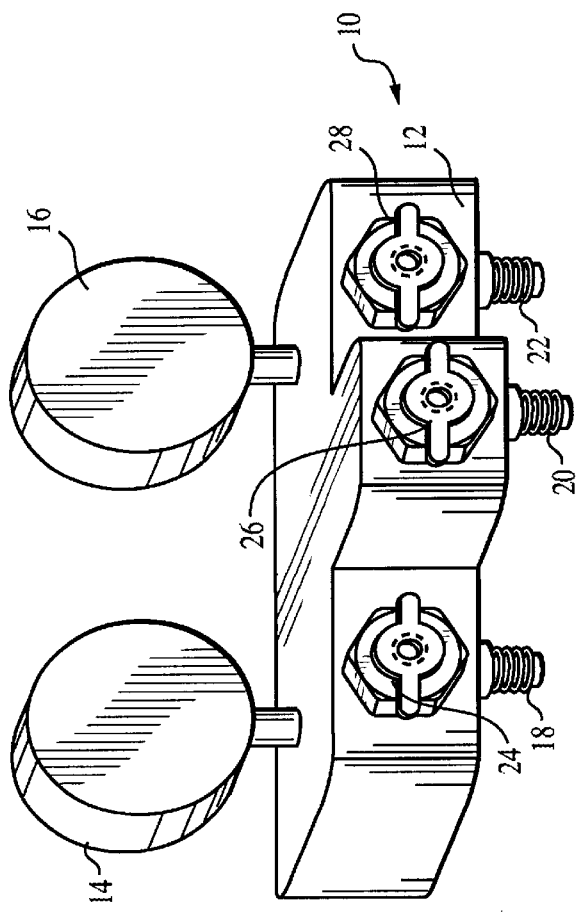
FIG. 1 is a perspective view of a manifold gauge set assembly according to a first embodiment of my invention.
Figure 2:
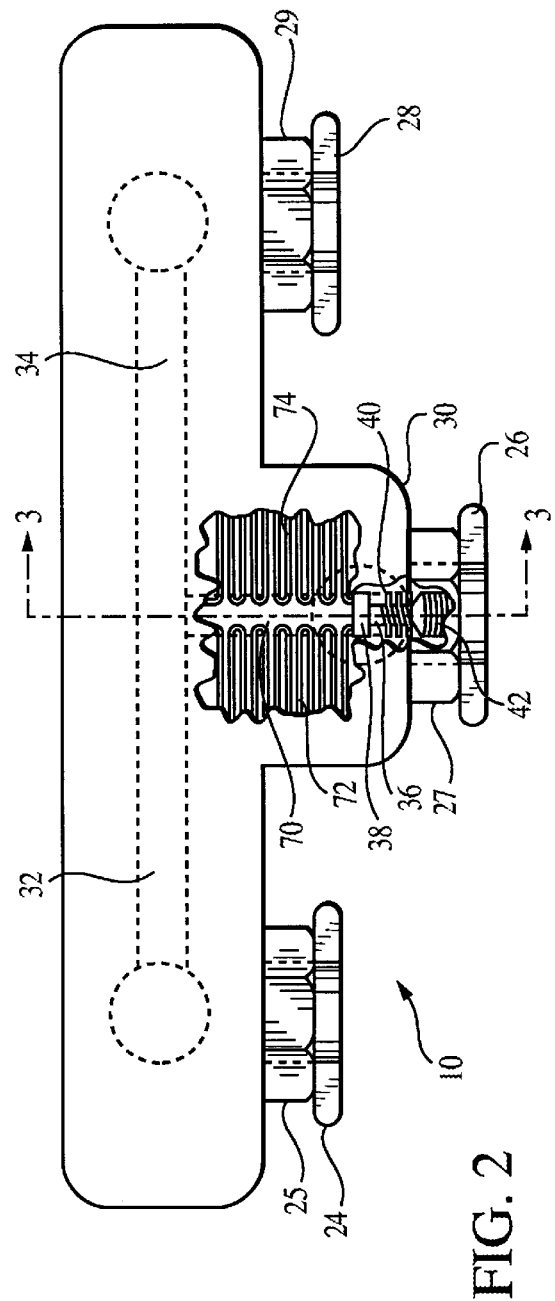
FIG. 2 is a plan view of the embodiment of FIG. 1, with portions cut away and the gauges removed to show aspects of the phase change portion of the assembly, and with fluid passageways in the manifold block shown in broken lines.
Figure 3:
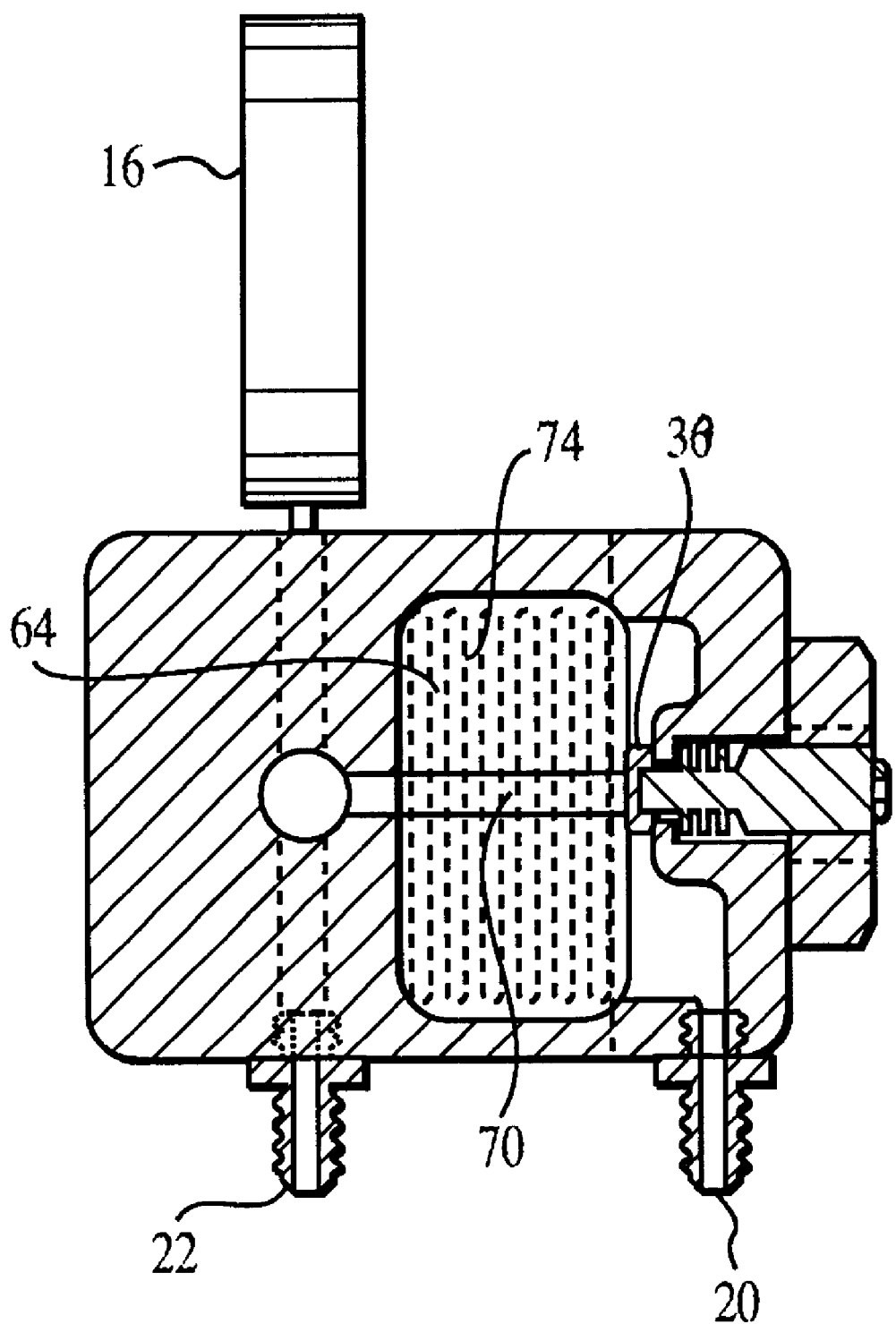
FIG. 3 is a cross-sectional view of the manifold gauge assembly taken along 3—3 of FIG. 2.

A manifold gauge set assembly 10 according to an embodiment of the present invention is illustrated in FIGS. 1–3. The assembly includes a housing comprising a manifold block portion 12 and a projection 30. The manifold block portion 12 includes conventional low and high side gauges 14, 16, respectively. Connectors 18, 20, 22 are provided to attach to fluid transfer conduits, such as hoses, to establish fluid communication with a reservoir of a fluid, such as a refrigerant. Control devices, such as handles 24, 26 and 28, are provided for controlling valves (not shown) for opening and closing fluid passageways within manifold block portion 12, thereby establishing a route for transport of the fluid from the reservoir to its ultimate destination, such as a refrigeration or air conditioning system. Preferably, the housing is formed of conventional materials commonly used in the refrigeration industry, such as brass, anodized aluminum, steel, various composite materials and compatible elastomers.

As shown in FIG. 2, the phase change portion of manifold gauge assembly 10 is substantially housed within projection 30, which is integrally formed with manifold block portion 12. In the embodiment shown, projection 30 extends outwardly in generally perpendicular fashion from block portion 12. A portion of the upper surface of assembly 10 is cut away and the gauges are removed in FIG. 2 to better illustrate details of the phase change feature of assembly 10. Fluid passageways 32, 34 in manifold block portion 12 are shown in broken lines. As illustrated in the figures, handles 24, 26, 28 are spaced from respective block 12 and projection 30 of assembly 10 by hexagonal nuts 25, 27, 29. FIG. 2 shows stem portion 36 and leading edge 38.

FIG. 3 is a cross-sectional view taken along lines 3—3 of FIG. 2. Stem portion 36 is rotatably connected to handle 26 via a threaded connection formed by complementary screw threads 40, 42, in order to translate the rotation of handle 26 to axial movement of stem portion 36 and leading edge 38. The internal elements in FIGS. 2 and 3 are shown with greater particularity and discussed in greater detail in connection with the discussion of FIGS. 5 and 6.

The embodiment of FIGS. 1–3 illustrates an arrangement wherein the phase change portion of assembly 10 is housed in a projection 30 that is integrally formed with manifold block portion 12. Alternatively, the phase change portion of assembly 10 could be fully positioned within the main body of block portion 12, thereby eliminating the portion 30 of assembly 10 that projects outwardly from block 12. In this event, handle 26 would be spaced outwardly from the main body of block 12 substantially the same distance as handles 24, 28.

In an alternative embodiment, the manifold block and the phase change device may initially be formed as separate components, and combined by conventional attachment methods to form a unitary structure. An example of such an arrangement comprises a conventional manifold block having a sight glass. In this arrangement, the phase change device could, for example, be fixedly attached by screwing or other means into the sight glass orifice to form a unitary structure.

Figure 4:
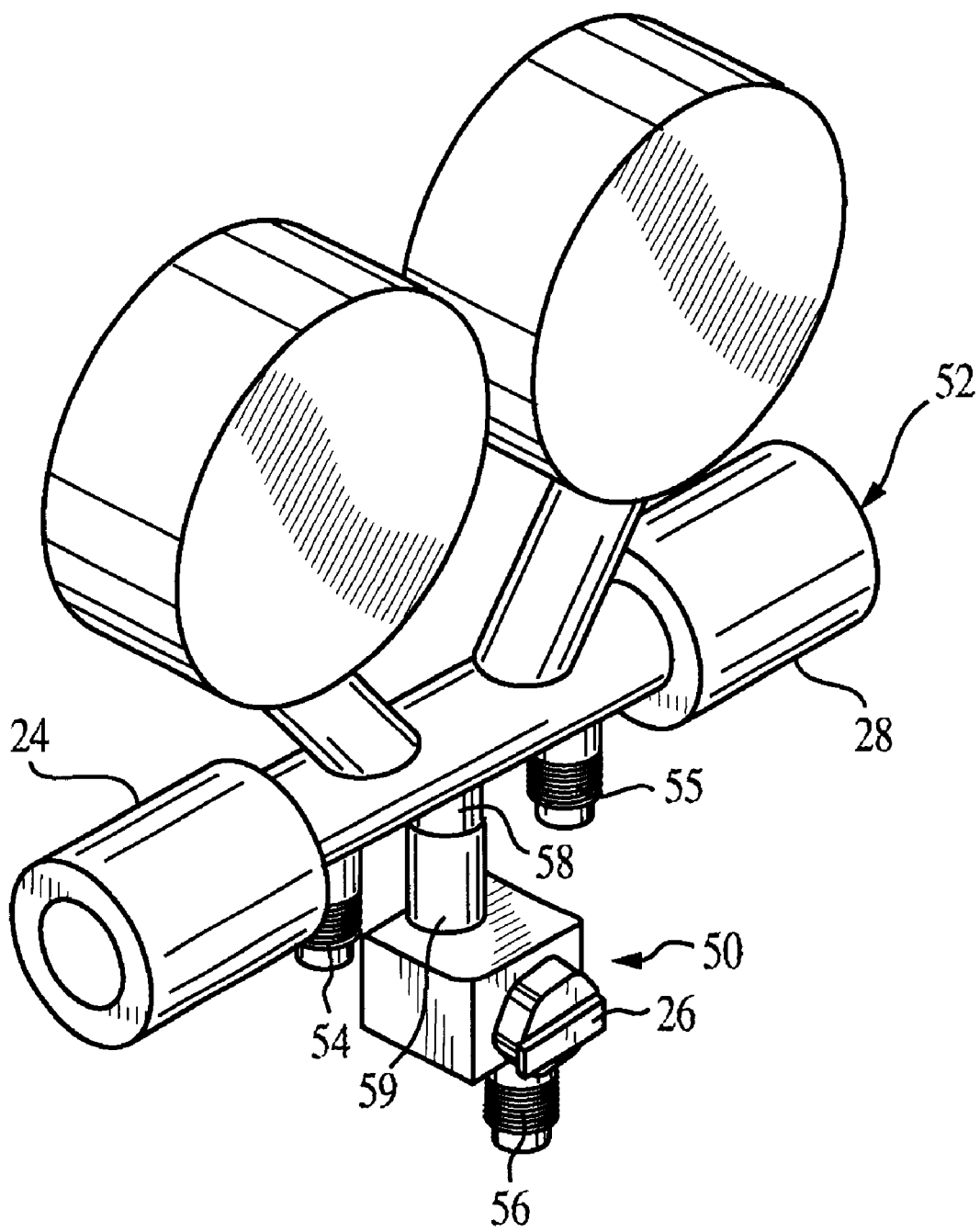
FIG. 4 is a perspective view of an alternative embodiment of a manifold gauge set according to the present invention.

FIG. 4 illustrates an embodiment wherein an existing manifold block is combined with a phase change device. This embodiment combines the features of a manifold and phase change device by fixedly attaching phase change device 50 to an existing manifold, such as the conventional manifold 52 shown in the figure. Connectors 54, 56, 58 are provided for attachment to fluid transfer conduits. The components of this assembly are fixedly combined to form a permanent charging apparatus, much in the same manner as the integral assembly of FIG. 1. In this case, phase change device 50 includes connector 60 (FIGS. 5 and 6) on an upper surface thereof Connector 60 is attached to manifold 52 by conventional attachment means known to those skilled in the art, such as female coupling member 59 shown in FIG. 4.

Figure 5:
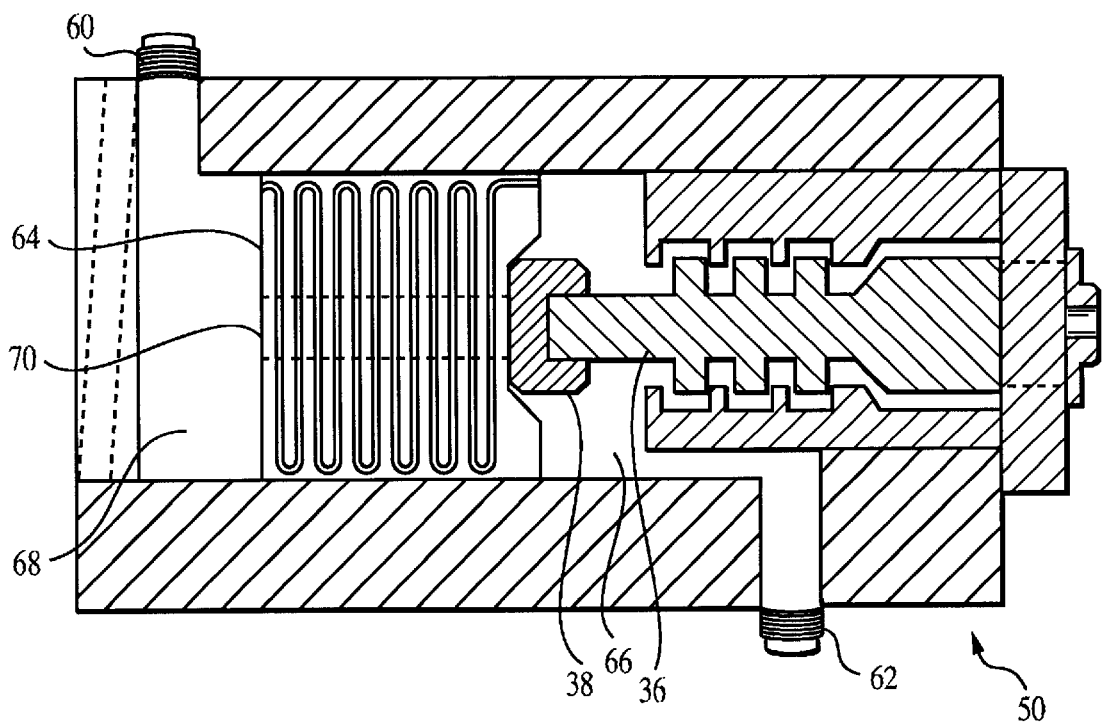
FIG. 5 is a partially-sectioned view of the phase change portion of the present invention, with the stem in the closed position.
Figure 6:
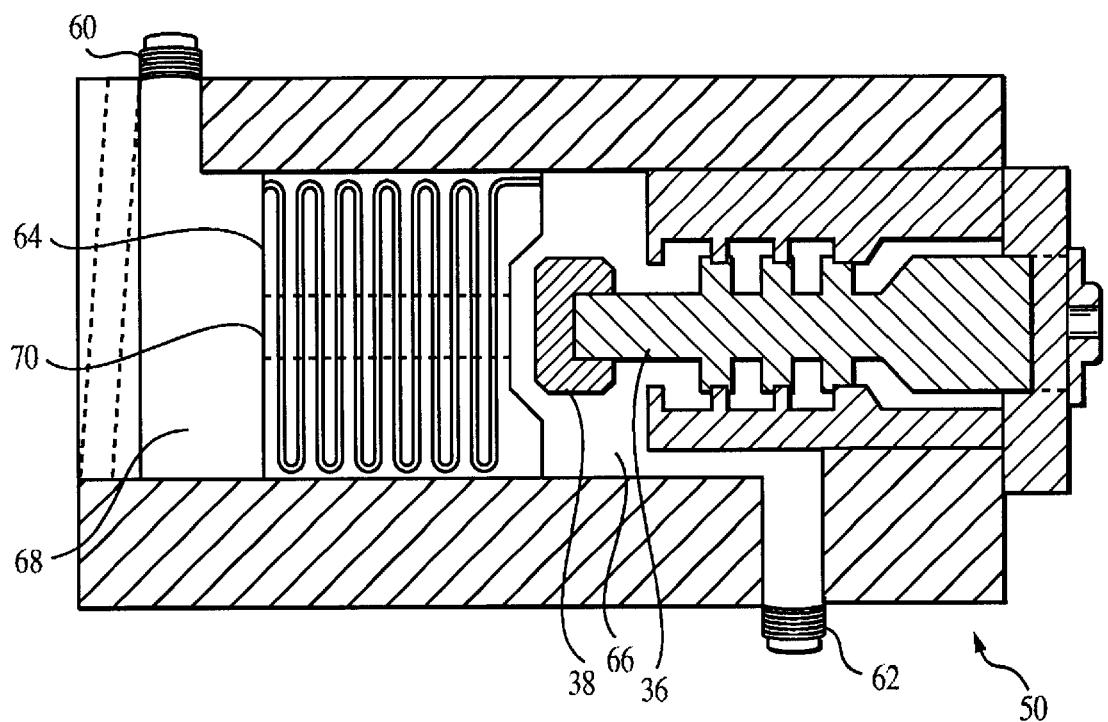
FIG. 6 is a partially-sectioned view similar to that of FIG. 5, with the stem in the open position.

The operation of the manifold gauge assembly may be better understood with reference to FIGS. 5 and 6, which illustrate in greater detail portions of the inner workings of the phase change aspect of the device. Like elements are referred to by common reference numerals in all of the figures. The partially-sectioned views of the phase change device 50 shown in FIGS. 5 and 6 illustrate the internal workings of device 50, which features are also common to the phase change aspect of the integral device shown in FIGS. 1–3.

In operation, phase change device 50 includes a restriction member that is press fit or otherwise fixed in place within the interior of device 50. In the embodiments of FIGS. 1 and 4, restriction member comprises a conventional generally cylindrical barrel-shaped portion 64. Although barrel-shaped restriction member 64 is shown in the figures, any configuration that is complementary to the configuration of the interior of device 50 to form a tight fit therewith and fulfills the purpose of the restriction member will suffice. The restriction member, or barrel portion 64, is preferably formed of conventional materials such as brass, anodized aluminum, steel, composite materials, elastomers and combinations of the foregoing, although those of skill in the art will appreciate that other similarly-compatible materials may be substituted.

As shown in FIGS. 5 and 6, barrel 64 is positioned within device 50 such that chambers 66, 68 are defined on opposite sides of barrel 64. Barrel 64 further includes a center port 70 (shown in broken lines) extending axially therethrough to establish communication between chambers 66, 68.

In the embodiment shown, barrel 64 has two orifices extending along its outer surface to establish communication between chambers 66, 68. In this embodiment, the orifices comprise two generally serpentine-shaped grooves 72, 74. As shown in FIG. 2, serpentine grooves 72, 74 are machined or otherwise formed in the outer surface of barrel 64, by conventional means known to those skilled in the art.

Preferably, each groove is disposed on a separate one-half of the outer surface (measured longitudinally) of barrel 64, and winds in repetitive serpentine fashion from the top of the device (with respect to the orientation of FIG. 1) to the bottom of the device and back. The partially-sectioned view of FIG. 3 illustrates (in broken lines) the serpentine groove 74 extending along the outer surface of one-half of barrel 64.

Although the embodiment illustrated in the figures shows two complementary serpentine-shaped grooves, other numbers of grooves may alternatively be provided, as well as grooves having other shapes, configurations and positions on the outer surface of barrel 64. For example, instead of the serpentine grooves that wind over respective longitudinal halves of the barrel as described, one or more helical grooves may be formed to wind completely around the outer surface of barrel 64 in helical fashion to provide communication between chambers 66, 68. Alternatively, one or more axial grooves may be formed to simply extend longitudinally on said outer surface between chambers 66, 68.

Those skilled in the art will recognize that stiff other configurations may be readily substituted for those specifically described. For example, due to the tight fit of the restriction member 64 in device 50, the desired effects can be obtained if the grooves are machined or otherwise formed on the inner surface of device 50, rather than on the outer surface of restriction member 64 as described. The use of an arrangement incorporating a plurality of grooves on the outer surface of barrel 64, such as the serpentine arrangement described, is presently favored, however, as it allows more fluid to be transported through the grooves and subjected to the phase change operation than when a single groove is utilized, and the configuration may be readily machined by conventional means. In addition, this arrangement enables the technician to easily control the amount of fluid passing between the chambers.

Although it is preferred that port 70 extends axially through the center of barrel 64 as shown, those skilled in the art will recognize that other configurations that accomplish the same purpose of enabling passage of refrigerant in the liquid phase through the barrel may be substituted. For example, the port need not necessarily extend axially through the center of the barrel, and may be axially positioned elsewhere on the barrel, or even as a groove or cutout on the outer axial surface of the barrel. Such alternative configurations may be substituted, as long as suitable provision is made to provide a stopper or related closure mechanism to enable the technician to selectively open and close the larger diameter port (when compared to the diameter of the grooves) to liquid refrigerant. Port 70 must be dimensioned such that liquid refrigerant entering port from chamber 66 remains in the liquid phase as it exits the port 70 and occupies chamber 68. Those skilled in the art will be readily able to dimension port 70 to have a large enough diameter such that the liquid refrigerant is not flashed to vapor as it passes therethrough. The exact dimensions are generally not critical as long as this objective is met.

The amount of fluid transported through the grooves may be controlled to a certain extent by the selection of the size, shape and number of grooves. However, those skilled in the art will appreciate that the cross-sectional area occupied by the groove(s) and the rate of fluid transport must be controlled in a manner such that the phase change benefits may be realized, or on other word that the liquid is flashed to a vapor, m accordance with known principles utilized in prior art phase change devices. This necessitates that consideration is given to the volume, density, pressure and temperature of all refrigerants used with the inventive manifold gauge assembly. Since the effect of the phase change is also a means of refrigerant flow control, the selection of the diameter, shape, equivalent length, and number of grooves (or the selection of the orifice size in the design of FIGS. 7 and 8) must be controlled in order to prevent compressor overload. Additional embodiments of the means of phase change can also include machined orifices and/or turbines that further capitalize on the venturi effects created with the change in velocity and pressure.

The manifold gauge set may be operated in the following manner. A hose (not shown) is connected at one end to connector 56 and at the other end to a cylinder or tank of refrigerant (not shown). Initially, handle 26 is rotated such that stem 36 and leading edge 38 are in the "open" position shown in FIG. 6. A release valve on the refrigerant cylinder is opened to allow liquid refrigerant that is maintained under pressure in the cylinder to escape through the hose via port 62 into chamber 66. As the liquid refrigerant enters chamber 66, the refrigerant flows through large diameter (relative to the diameter of the serpentine grooves) center port 70 to chamber 68 on the opposing side of barrel 64. The resistance offered by larger diameter center port 70 is less than that offered by the smaller diameter serpentine groove pathways 72, 74 on the outer surface of barrel 64, and therefore the fluid passes through port 70 as the path of least resistance. Center port 70 may, for example, have an inner diameter of 0.25 inch (0.64 cm), and serpentine grooves 72, 74 may each have a diameter, for example, of 0.03 inch (0.08 cm).

Thus, as stated, the refrigerant passes from chamber 66 to 68 through the center port. Subsequently, the pressure present in chamber 68 is greater than the pressure exhibited on the leaving end (at the chamber 68) of serpentine grooves 72, 74, thereby preventing fluid backflow into the grooves 72, 74. Chamber 68 is in fluid communication with the fluid passageways in the manifold, such that the liquid refrigerant is selectively directed by opening valves 24 or 28, which connect pathways 32 and 34, respectively, into the low side or the high side of the system. Generally, when chambers 66, 68 are in communication via center port 70, the liquid is directed into the high side.

When it is desired to charge into the low side, handle 26 is rotated such that stem 36 and leading edge 38 are advanced axially to the "closed" position. This position is shown in FIG. 5. In this arrangement, stem leading edge 38 seals off center port 70, thereby preventing refrigerant from flowing to chamber 68 from chamber 66 by way of port 70, as described above. Serpentine grooves 72, 74 on barrel 64 are now dominant, and the liquid entering chamber 66 now passes through grooves 72, 74. The restriction created reduces the pressure and volume, such that as the liquid enters chamber 68 it will expand at the reduced pressure and "flash" (change state) from liquid to saturated vapor, in a manner well known to those skilled in the art. With valve 24 open, the saturated vapor passes through pathway 32 and port 54 (or 18 in the embodiment of FIG. 1) to the low side of the system.

In addition to the arrangements described above, still other arrangements may be utilized, and are within the scope of the invention. For example, rather than utilizing a barrel having grooves on an outer surface thereof as described previously, the liquid refrigerant can be flashed to a vapor utilizing a valve and porting device as shown in the embodiments of FIGS. 7 and 8.

Figure 7:
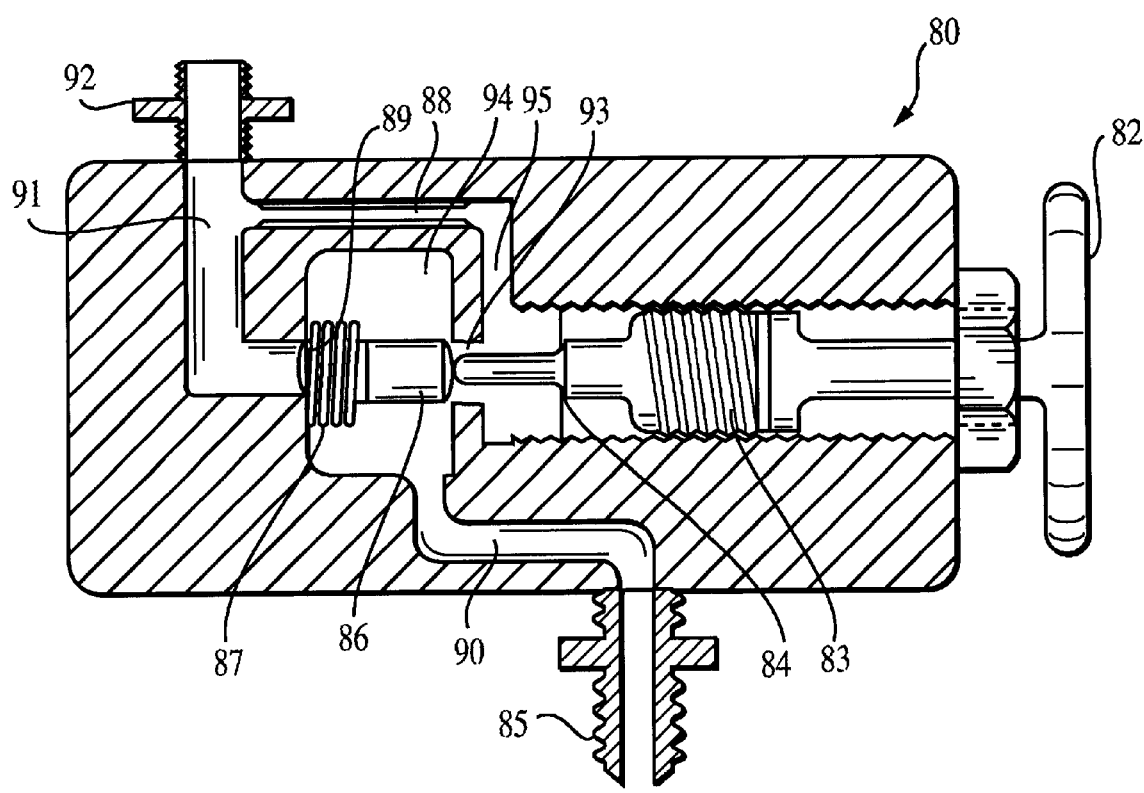
FIGS. 7 and 8 illustrate a partially-sectioned representation of another embodiment of the present invention, for use with an existing manifold gauge.
Figure 8:
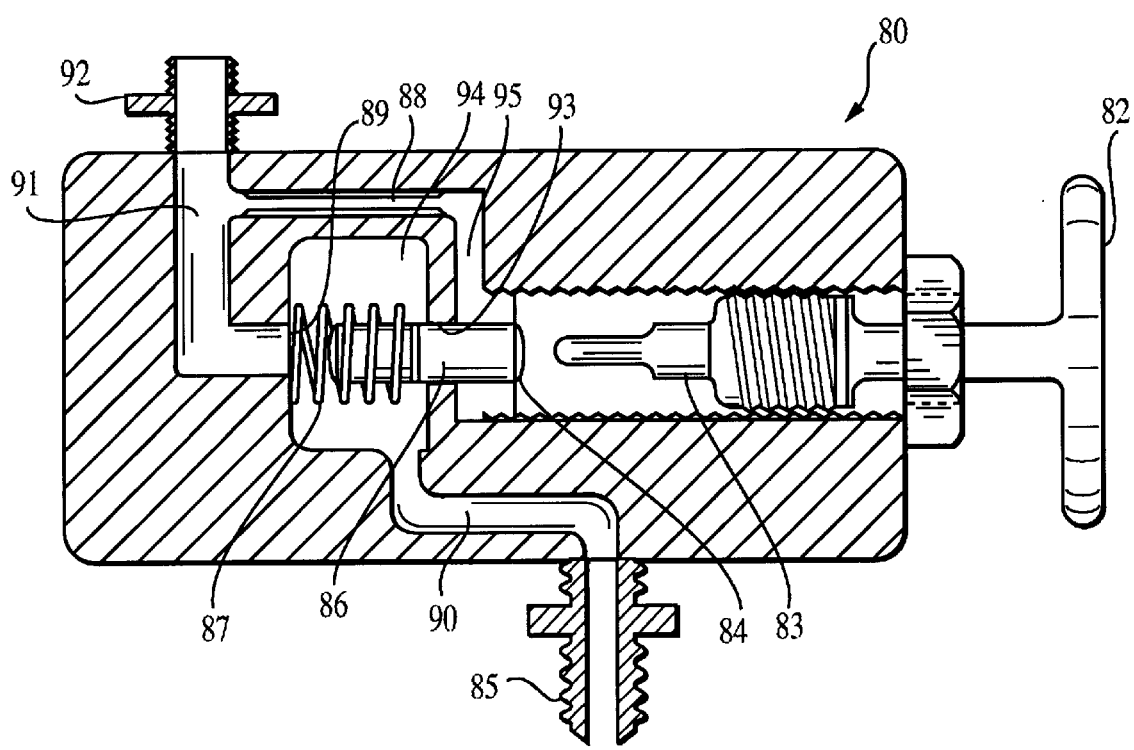

FIGS. 7 and 8 show a partially-sectioned representation of a free-standing device 80 for the field adaptation of an existing manifold gauge to convert it to a unitary device for the previously described benefits and advantages. Although the device of FIGS. 7 and 8 is designed for fixed attachment to an existing manifold gauge, with minor adaptation this device could alternatively be manufactured with an otherwise conventional gauge as an integral manifold gauge set assembly.

Referring now to the device of FIGS. 7 and 8, liquid refrigerant enters at port 85 from an external source and follows pathway 90 to inner chamber 94. By turning handle 82 in a first direction, depressor pin 83 breaks contact with tapered seat 86, to allow control spring 87 to press tapered seat 86 into port seat 93, thereby closing pathway 95 and opening port seat 89 to pathway 91. Liquid refrigerant in chamber 94 passes through port seat 89 into pathway 91, and into the existing manifold gauge set via connection 92. With this arrangement, the liquid refrigerant is directed internally in the gauge set to the high side of the system in the manner described in the previous embodiments.

Upon rotating control handle 82 in a second direction, depressor pin 83 contacts tapered seat 86 and depresses control spring 87, thereby closing port seat 89 and opening port seat 93. With seat 93 in the open position, liquid refrigerant travels through pathway 95 and enters restricted-diameter orifice port 88. Port 88 is dimensioned in accordance with refrigerant density, volume, pressure and temperature in the same manner as the grooves in the previous embodiments, thereby creating the pressure drop and resulting in expansion of liquid refrigerant to saturated vapor in pathway 91 and into the manifold gauge set connection via port 92. The vapor refrigerant is directed internally in the gauge set to the low side of the system as previously described. Pathway 91 and restricted-diameter port 88 may, for example, have the relative diameters of the embodiments of FIGS. 1–6, namely about 0.25 inch (0.64 cm) and about 0.03 inch (0.08 cm), respectively.

Figure 10:
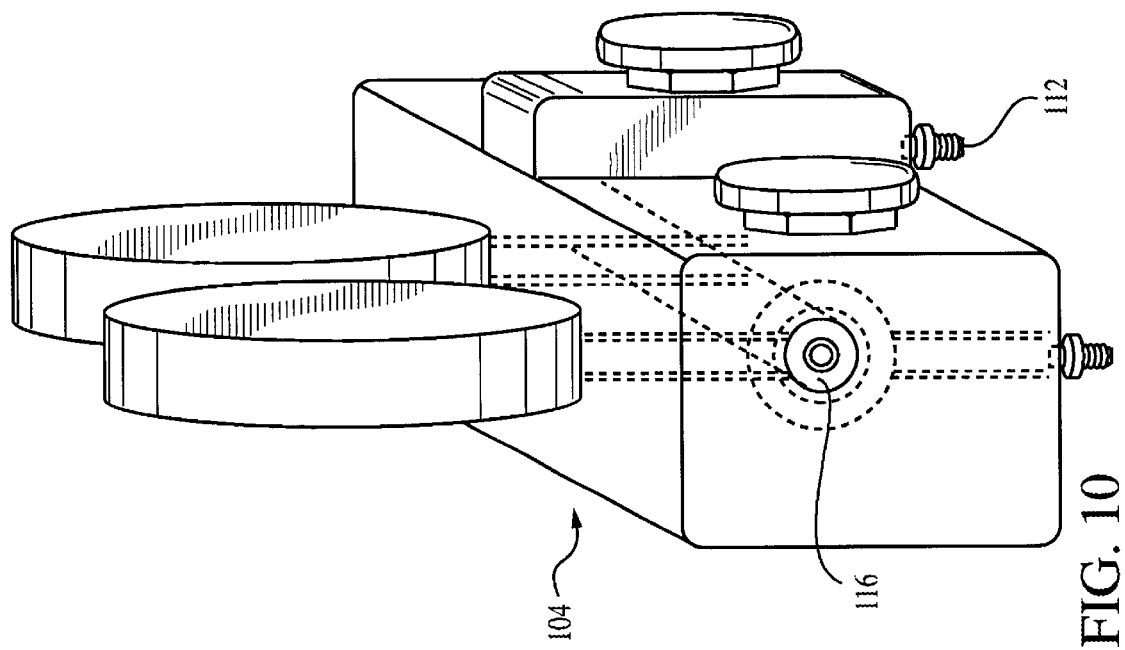
FIGS. 9 and 10 illustrate an alternative embodiment of the phase change device that is incorporated into the manifold body.
Figure 9:
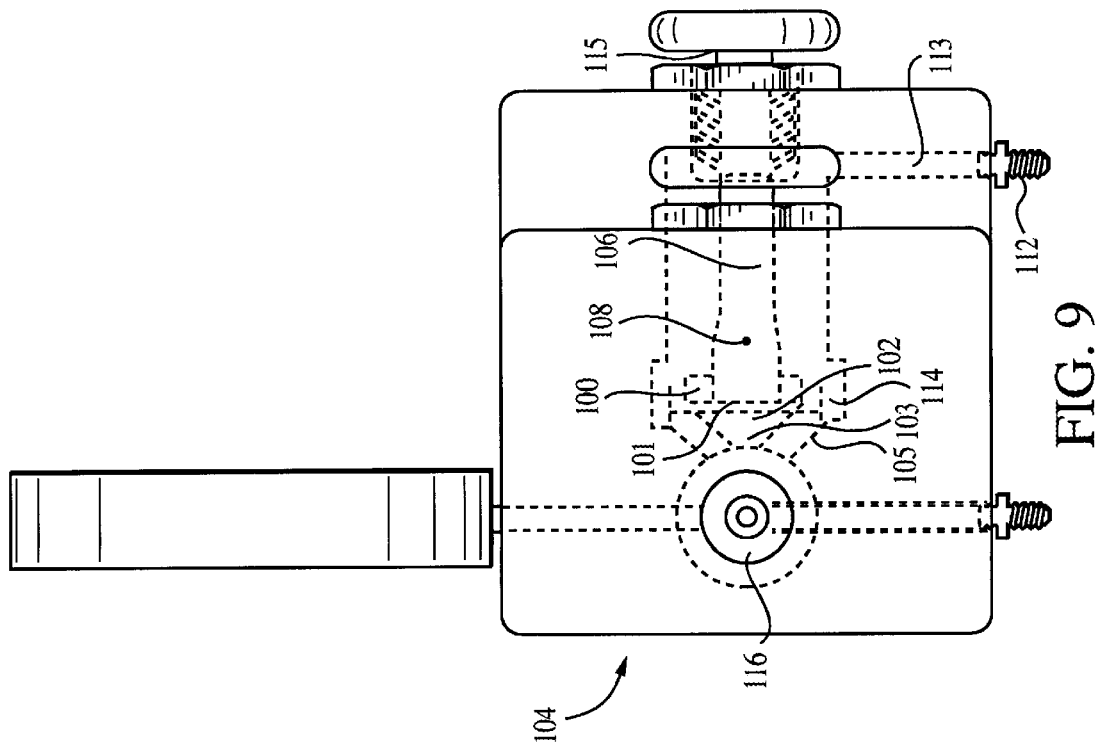
Figure 11:
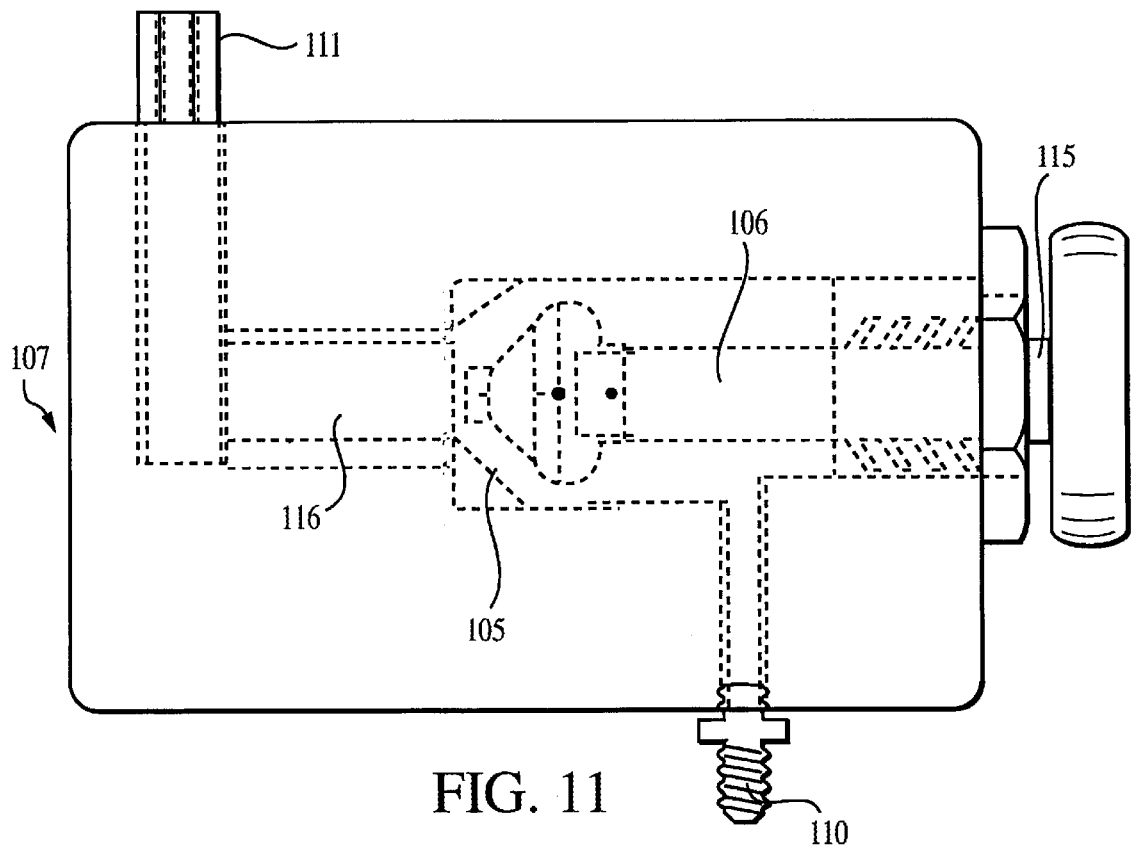
FIG. 11 illustrates an alternative device that is fixedly attached to a conventional gauge set utilizing the phase change device of FIGS. 9 and 10.
Figure 12:
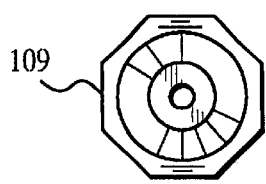
FIG. 12 is an end view of the valve stem/seat phase change device FIGS. 9–11.
Figure 13:
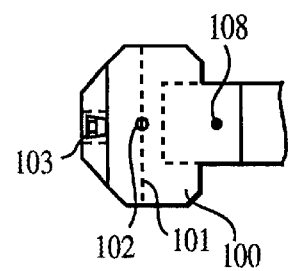
FIG. 13 is a cut-away view of the phase change device shown in FIGS. 9–11.

FIGS. 9 and 10 illustrate yet another embodiment of a phase change device that is incorporated into a manifold body to form an integral assembly. FIG. 11 illustrates an embodiment operationally similar to that of FIGS. 9 and 10, but that is intended to be fixedly attached to a conventional manifold gauge set. FIGS. 12 and 13 show additional operational details of these embodiments.

In these embodiments, the refrigerant is flashed by means of porting from a larger internal diameter to a smaller internal diameter. Liquid refrigerant enters via port 112 and travels through pathway 113 to chamber 114. By rotating valve/valve stem assembly 115 in a first direction, the liquid refrigerant passes substantially unimpeded to center port 116 as before. By rotating assembly 115 in a second direction, center port 116 is closed off at machined seat 105. The refrigerant is forced through the side(s) of valve stem seat 100 at ports 109, and via internal pathway 101 to center port 102, from which point the liquid refrigerant passes through a tapered path from small internal diameter to larger internal diameter.

Center port 116 and seat 105 on the refrigerant entering side may include refrigerant compatible seating material for accommodating and sealing with the corresponding valve stem seat/phase change device 100. This configuration can be easily adapted to the independent device designed for the field purchased manifold gauge set 107 represented in FIG. 11 by way of attachment port 111.

This embodiment can also include a device 103 to act as a balanced restriction that, by means of the venturi effect, offers an additional pressure drop and increased friction to enhance the pressure drop effects. The manifold gauge set body has a center bore pathway 116 with a machined seat 105 on the refrigerant entering side that may include refrigerant compatible seating material for accommodating and sealing with the corresponding valve stem seat/phase change device 100. This configuration can be easily adapted to the independent device designed for the field purchased manifold gauge set device 107 represented in FIG. 11.

Device 107 is permanently attached to a field purchased manifold gauge set at fitting 111. The refrigerant enters at fitting 110 and follows the pathways described above. FIG. 12 shows an end view of the valve seat/phase change device 100, identifying the possible port locations at 109. FIG. 13 shows a cut view of valve seat/phase change device 100, further illustrating entry ports 109 and connector hole 108, to attach device 100 to valve stem 106.

Figure 14:
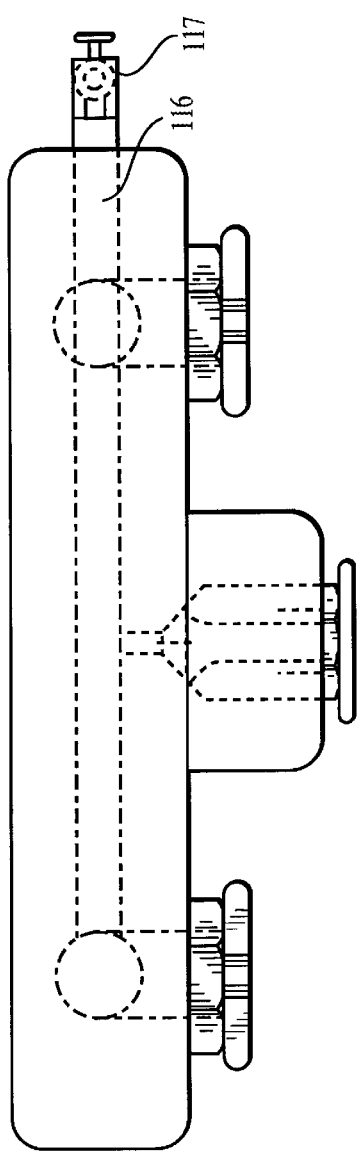
FIG. 14 is a plan view of another embodiment of the present invention with the gauges removed, and having an additional side valve access.
Figure 16:
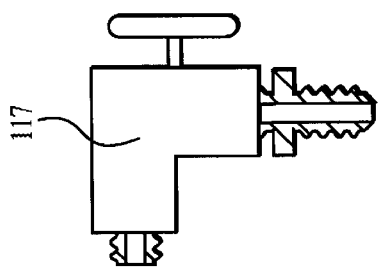
FIG. 16 is a cut-away view of angle valve 117 shown in FIGS. 14 and 15.
Figure 15:
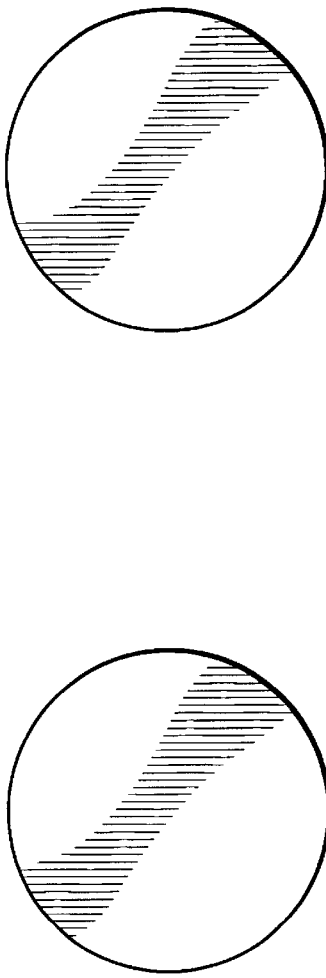
FIG. 15 is a front view of the embodiment of FIG. 14.
Figure 15:
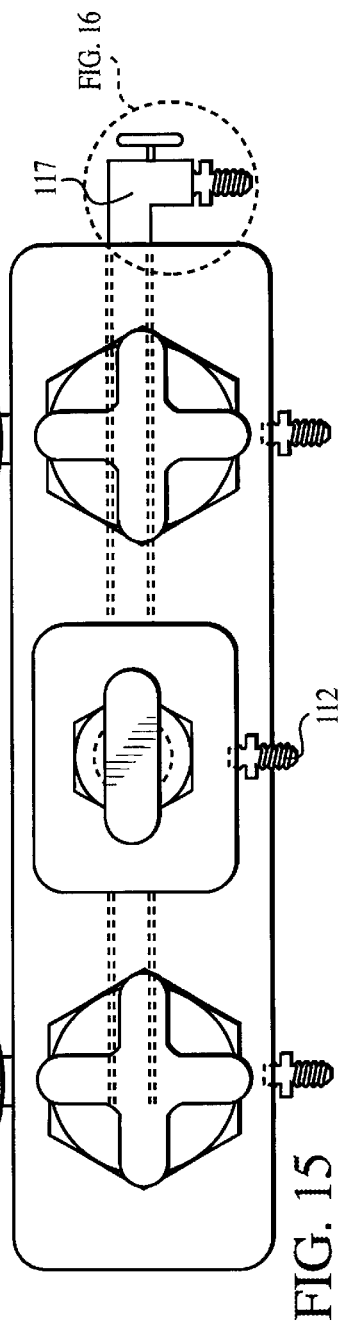

Another embodiment of the device of the present invention is shown in FIGS. 14–16. This embodiment includes internal components and functions as described previously, and an additional access valve 117. Valve 117 is located in the center porting 116, thereby allowing communication between valve 117 and all porting intersecting center port 116. FIG. 15 is a front view with valve 117 illustrated in concert with center porting 116. FIG. 16 shows a cut-away view of valve 117.

When not otherwise specified herein, the selection of particular materials for the manufacture and assembly of the manifold gauge set assembly is well within the knowledge of those skilled in the art. Generally, it is expected that the assemblies, purchased parts and other components will comply with and satisfy the applicable industry codes and standards, e.g., SAE, U.L., etc.

While this invention has been particularly shown and described with reference to preferred embodiments thereof, it will be understood by those skilled in the art that various changes in form and details may be made therein without departing from the spirit and scope of the invention. Those skilled in the art may recognize or be able to ascertain using no more than routine experimentation, many equivalents to the specific embodiments of the invention described specifically herein, which equivalents are intended to be encompassed in the scope of the invention.

What is claimed is:

1. A manifold gauge set assembly comprising:

a housing; said housing enclosing a manifold portion and a phase change portion;

said manifold portion having at least one passageway for establishing fluid communication between the container and respective high and low sides of the refrigeration system; and said phase change portion upstream of said manifold for receiving refrigerant from said container and providing a conduit for said refrigerant from said container to said manifold portion, said phase change portion including means for selectively conveying liquid refrigerant to said manifold portion, and for flashing said liquid refrigerant to a gaseous state and conveying said gaseous refrigerant to said manifold portion.

2. The assembly of claim 1, wherein said means comprises a first chamber for receiving said liquid refrigerant from said container, a second chamber for receiving refrigerant from said first chamber, and a restriction member intermediate said first and second chambers, said restriction member having a port extending therethrough for enabling passage of liquid refrigerant from said first chamber to said second chamber, said phase change portion further including a stopper movable between respective open and closed positions for selectively opening and closing said port to said passage of liquid refrigerant, and a controller for controlling movement of said stopper between said positions, said restriction member being aligned and configured with respect to said housing such that at least one orifice is defined therebetween for establishing fluid communication between said first and second chambers such that when said stopper is in the closed position liquid refrigerant in said first chamber passes through said orifice and is received in said second chamber substantially in a gaseous phase.

3. A manifold gauge set assembly for charging refrigerant from a container into a refrigeration system, comprising:

a housing, said housing enclosing a manifold portion and a phase change portion;

said manifold portion having at least one passageway for establishing fluid communication between the container and respective high and low sides of the refrigeration system; and said phase change portion upstream of said manifold for receiving refrigerant from said container and providing a conduit for said refrigerant from said container to said manifold portion, said phase change portion including a first chamber for receiving liquid refrigerant from said container, a second chamber for receiving refrigerant from said first chamber, and a restriction member intermediate said first and second chambers, said restriction member having a port extending therethrough for enabling passage of liquid refrigerant from said first chamber to said second chamber, said phase change portion further including a stopper movable between respective open and closed positions for selectively opening and closing said port to said passage of liquid refrigerant, and a controller for controlling movement of said stopper between said positions, said restriction member being aligned and configured with respect to said housing such that at least one orifice is defined therebetween for establishing fluid communication between said first and second chambers such that when said stopper is in the closed position liquid refrigerant in said first chamber passes through said orifice and is received in said second chamber substantially in a gaseous phase.

4. The assembly of claim 3, wherein said orifice comprises at least one axial groove extending between said first and second chambers on an outer surface of said restriction member.

5. The assembly of claim 3, wherein said orifice comprises at least one serpentine-shaped groove extending between said first and second chambers on an outer surface of said restriction member.

6. The assembly of claim 5, comprising two serpentine-shaped grooves, each of said grooves disposed on a separate longitudinal one-half of said outer surface.

7. The assembly of claim 3, wherein said orifice comprises at least one helical groove extending from said first chamber to said second chamber on an outer surface of said restriction member.

8. The assembly of claim 3, wherein said orifice comprises a recessed portion of an interior surface of said housing.

9. The assembly of claim 3, wherein said port extends axially through the center of said restriction member.

10. The assembly of claim 3, wherein said housing includes a projection extending transverse to the longitudinal axis of the housing, and wherein said phase change portion is substantially housed in said projection.

11. The assembly of claim 3, wherein said stopper comprises a stem portion having a leading edge engageable with said restriction member port for closing said port to the passage of liquid refrigerant.

12. The assembly of claim 11, wherein said controller comprises a handle rotatably connected to said stem portion for selectively opening and closing said port.

13. The assembly of claim 3, further comprising an access valve engaged with said housing at said manifold portion, said access valve in fluid communication with said manifold passageway.

14. The assembly of claim 3, wherein said port has an inner diameter of about 0.64 cm, and said at least one orifice has a diameter of about 0.08 cm.

15. A manifold gauge set assembly for charging refrigerant from a container into a refrigeration system, comprising:
   a manifold portion, said manifold portion having at least one passageway for establishing communication between the container and respective high and low sides of the refrigeration system for enabling passage of refrigerant from said container into said refrigeration system; and
   a phase change portion fixedly attached with said manifold portion for receiving refrigerant from said container and for providing a conduit for said refrigerant between said container and said manifold portion, said phase change portion including a body having a first chamber for receiving liquid refrigerant from said container, a second chamber in communication with said first chamber for receiving refrigerant from said first chamber, and a restriction member, said restriction member having a port extending therethrough for enabling passage of liquid refrigerant from said first chamber to said second chamber, said phase change portion further including a stopper movable between respective open and closed positions for selectively opening and closing said restriction member port to passage of said liquid refrigerant, and a controller for controlling movement of said stopper between said positions, said body and said restriction member being configured and aligned to provide at least one orifice therebetween such that when said stopper is in the closed position refrigerant in said first chamber passes through said orifice and is received in said second chamber in a gaseous phase.

16. The manifold gauge assembly of claim 15, wherein said phase change portion is fixed to said manifold portion at a site glass orifice of said manifold portion.

17. The manifold gauge assembly of claim 15, wherein said orifice comprises at least one axial groove extending between said first and second chambers on an outer surface of said restriction member.

18. The assembly of claim 15, wherein said orifice comprises at least one serpentine-shaped groove extending between said first and second chambers on an outer surface of said restriction member.

19. The assembly of claim 15, wherein said orifice comprises a recessed portion of an interior surface of said housing.

20. The assembly of claim 15, wherein said port extends axially through the center of said restriction member.

21. The assembly of claim 15, wherein said stopper comprises a stem portion having a leading edge engageable with said restriction member port for closing said port to the passage of liquid refrigerant.

22. The assembly of claim 15, wherein said port has an inner diameter of about 0.64 cm, and said at least one orifice has a diameter of about 0.08 cm.

23. A phase change device for fixed attachment to a manifold to form a manifold gauge set assembly, said phase change device comprising:
   a body portion, said body portion having an entry port for receiving liquid refrigerant from a container, and an exit port for conveying refrigerant from said body portion to said manifold; said body having an inner chamber for receiving said liquid refrigerant, and a stopper, said stopper selectively movable between a first position wherein said liquid refrigerant is conveyable through said chamber to said exit port in liquid form, and a second position wherein said liquid refrigerant is conveyable through a restricted-diameter orifice dimensioned for expansion of liquid refrigerant to a gaseous state upon passage from said first chamber to said second chamber; said body including a controller for controlling movement of said stopper between said first and second positions, and having an attachment mechanism for establishing said fixed attachment between said body portion and said manifold.

24. The phase change device of claim 23, wherein said controller comprises a rotatable handle.

25. The phase change device of claim 23, further comprising a control spring for moving said stopper to said first position.

26. A manifold gauge set assembly for charging refrigerant from a container into a refrigeration system, said assembly comprising:
   a manifold portion, said manifold portion having at least one passageway for establishing communication between the container and respective high and low sides of the refrigeration system for enabling passage of refrigerant from said container into said refrigeration system; and
   a phase change portion operationally engaged with said manifold portion for receiving refrigerant from said container and providing a conduit for said refrigerant between said container and said manifold portion, said phase change portion including a body having a chamber for receiving liquid refrigerant from said container, said chamber in communication with said manifold portion for enabling passage of liquid refrigerant to said manifold portion, said phase change portion further including means for selectively restricting said communication, and means for directing said liquid refrigerant through a smaller diameter segment to a larger diameter segment, said smaller and larger diameter segments dimensioned such that when said liquid refrigerant enters said larger diameter segment it flashes to a gaseous state for passage to said manifold portion.

27. The assembly of claim 26, further comprising a housing for said manifold portion and said phase change portion.

28. The assembly of claim 26, further comprising a balanced restriction device for increasing a pressure drop of said refrigerant as it flashes to said gaseous phase.

29. The assembly of claim 26, further comprising a fitting member for establishing fixed connection between said manifold portion and said phase change portion.

* * * * *